United States Patent
Furuyama et al.

(10) Patent No.: US 6,871,865 B2
(45) Date of Patent: Mar. 29, 2005

(54) HOLLOW STABILIZER

(75) Inventors: Tsutomu Furuyama, Yokohama (JP); Hiroshi Koyama, Yokohama (JP); Yoshihiro Koshita, Yokohama (JP); Jun Umeno, Yokohama (JP); Koichi Tamatsu, Yokohama (JP)

(73) Assignee: NHK Spring Co., Ltd., Kanagawa (JP)

( * ) Notice: Subject to any disclaimer, the term of this patent is extended or adjusted under 35 U.S.C. 154(b) by 0 days.

(21) Appl. No.: 10/277,109

(22) Filed: Oct. 22, 2002

(65) Prior Publication Data

US 2003/0075895 A1 Apr. 24, 2003

(30) Foreign Application Priority Data

Oct. 22, 2001 (JP) ......................................... 2001-324115

(51) Int. Cl.[7] ............................................. B60G 21/055
(52) U.S. Cl. ........................... 280/124.107; 280/124.152
(58) Field of Search .................. 280/124.152, 124.107, 280/124.137, 124.149; 267/154, 273, 188

(56) References Cited

U.S. PATENT DOCUMENTS

| | | | |
|---|---|---|---|
| 2,589,009 A | | 3/1952 | Leighton |
| 3,540,714 A | * | 11/1970 | Mueller ........................ 267/154 |
| 4,066,278 A | * | 1/1978 | Takagi .................. 280/124.152 |
| 4,138,141 A | | 2/1979 | Andersen |
| 4,231,555 A | * | 11/1980 | Saito ........................... 267/154 |
| 4,533,402 A | | 8/1985 | Ohno et al. |
| 4,854,150 A | * | 8/1989 | Brown et al. .................. 72/369 |
| 6,308,972 B1 | * | 10/2001 | Kincad et al. ......... 280/124.107 |
| 6,311,965 B1 | * | 11/2001 | Muhr et al. .................. 267/273 |
| 6,446,484 B1 | * | 9/2002 | Anderson et al. ............. 72/477 |

FOREIGN PATENT DOCUMENTS

| EP | 0 878 334 A1 | 11/1998 |
|---|---|---|
| GB | 1010960 | 6/1964 |

* cited by examiner

*Primary Examiner*—David R. Dunn
(74) *Attorney, Agent, or Firm*—Arent Fox PLLC

(57) ABSTRACT

A hollow stabilizer made of a steel pipe, comprises: a torsion portion extending in a width direction of a vehicle body; a pair of right and left arm portions positioned at both end sides of the torsion portion; and a plurality of curved portions which are bent in an arc shape in any of the torsion portion, the arm portions and portions therebetween. Bending radii of the plurality of curved portions are different from each other.

2 Claims, 3 Drawing Sheets

HOLLOW STABILIZER

BACKGROUND OF THE INVENTION

1. Field of the Invention

The present invention relates to improvement in a hollow stabilizer which is used for a vehicle such as a motor vehicle or the like.

2. Description of the Related Art

Conventionally, a spring member has been used as a stabilizer for increasing a roll rigidity of a vehicle. The stabilizer is provided with a torsion portion which extends in a width direction of the vehicle, arm portions which are positioned in both side ends of the torsion portion, and a curved portion which connects both of the torsion portion and the arm portions to a shoulder portion between the torsion portion and the arm portions. Furthermore, the curved portion may be provided not only in the shoulder portion but also in the arm portions and the torsion portion.

In the stabilizer mentioned above, loads in vertically opposite directions to each other are input to both of the arm portions at a time when the vehicle travels on a curved road, whereby both of the arm portions are bent in directions opposite to each other. Thus, the torsion portion is twisted, and a rolling of the vehicle body is inhibited by a repulsive force which is generated at this time. Therefore, a bending stress is mainly generated in the arm portions, and a torsional stress is mainly generated in the torsion portion. Furthermore, a combined stress between the bending stress and the torsional stress is generated in the shoulder portion. Furthermore, a solid round bar is used as a material of the conventional stabilizer; however, there a hollow stabilizer is known employing a pipe member for the purpose of weight reduction of the vehicle.

In this case, a fuel tank, an exhaust pipe, a frame and various kinds of rods are placed under a floor of the vehicle, and in order to pass the stabilizer through gaps between such parts, the stabilizer may often be bent in a three-dimensional manner by forming a plurality of curved portions in the torsion portion, the arm portions and/or the shoulder portion.

A bending method for the conventional hollow stabilizer is shown in FIG. 5. A bending apparatus 50 is provided with a bending mold 52 having a circular arc forming surface 51, a clamp mold 53, and a pressure mold 54 which press a stabilizer main body 11. The bending mold 52 is rotated in a direction of an arrow in the drawing by a rotation driving mechanism (not shown), and is constructed so as to bend the stabilizer main body 11 in a circular arc shape having a center bending radius R along the forming surface 51.

The stabilizer is bent in a three-dimensional manner for the purpose of passing through the gaps between the various kinds of parts in the vehicle. However, in order to bend in a three-dimensional manner by using the conventional bending mold, a plurality of two-dimensional bending processes are combined. In the case of the conventional bending mold, due to the shape of the bending mold, the bending process can be performed only by providing a straight portion between one curved portion and another curved portion. As a result, this length of material is useless. Furthermore, in order to have the stabilizer accommodated in the gap in which the other parts are provided in a complicated manner, it is necessary to provide a plurality of curved portions in the stabilizer so as to avoid interference with the parts. Accordingly, the number of bending processes is increased, and the number of the straight portions between the curved portions is also increased. However, it is often the case that it is difficult to receive the long straight portion in the gap in which the parts are complicated, and the necessity of bending the stabilizer little by little arises. As a result, it is impossible to set a large bending radius, and when the bending radius of the hollow stabilizer is made small, there is a problem that the pipe is flattened and of uneven thickness. If the pipe is flattened and of unevenly thickness, a stress concentration is generated, and therefore durability is reduced. Furthermore, in the case of performing the bending process for different diameters using the conventional bending mold, it is necessary to prepare numerous bending molds having different bending diameters, and a large amount of labor is required for controlling the bending molds.

SUMMARY OF THE INVENTION

Accordingly, an object of the present invention is to provide a hollow stabilizer which can be formed so that a pipe is inhibited from being flattened and becoming unevenly thick, and the pipe can be placed in a narrow gap between parts.

The present invention provides a hollow stabilizer made of a steel pipe, comprising: a torsion portion extending in a width direction of a vehicle body; a pair of right and left arm portions positioned at both end sides of the torsion portion; and a plurality of curved portions which are bent in an arc shape in any of the torsion portion, the arm portions and portions therebetween, wherein bending radii of the plurality of curved portions are different from each other.

The present invention provides another hollow stabilizer made of a steel pipe, comprising: a torsion portion extending in a width direction of a vehicle body; a pair of right and left arm portions positioned at both end sides of the torsion portion; and a plurality of curved portions which are bent in an arc shape in any of the torsion portion, the arm portions and portions therebetween, wherein the adjacent curved portions continue with each other without straight portion therebetween.

The present invention includes a hollow stabilizer in which bending radii of the plurality of curved portions are different from each other and the adjacent curved portions continue with each other without straight portion therebetween.

In the hollow stabilizer having the structure described above, since the structure is made such that a plurality of bending radii are different from each other, and/or the adjacent curved portions continue with each other without straight portion therebetween, the hollow stabilizer can be arranged in such a manner as to weave its way between the parts, by suitably setting the bending radius or continuously forming the bending portion.

In this case, the present invention is not limited to the case in which one bending radius is set to one bending portion, and the bending portion may be constituted by a plurality of different bending radii by making the bending radius of one curved portion change in the middle. By providing such a bending portion, it is possible to receive the hollow stabilizer in the gap between the parts which are further formed in a complicated manner.

Furthermore, in the case in which two curved portions are connected in a three-dimensional manner, each of the curved portions is individually bent in the conventional art; however, it is possible to obtain a similar shape to the case in which two curved portions are connected, by bending two curved portions in a spiral shape. In this case, it is possible to connect two points by a shorter distance from the starting point of the curved portion to the end point of the curved portion. Accordingly, it is possible to reduce a material cost and achieve a weight reduction. Furthermore since the portion between two points is constituted by a curve having a large bending radius, it is possible to effectively prevent the material from collapsing.

DESCRIPTION OF THE PREFERRED EMBODIMENT

Figure 1:
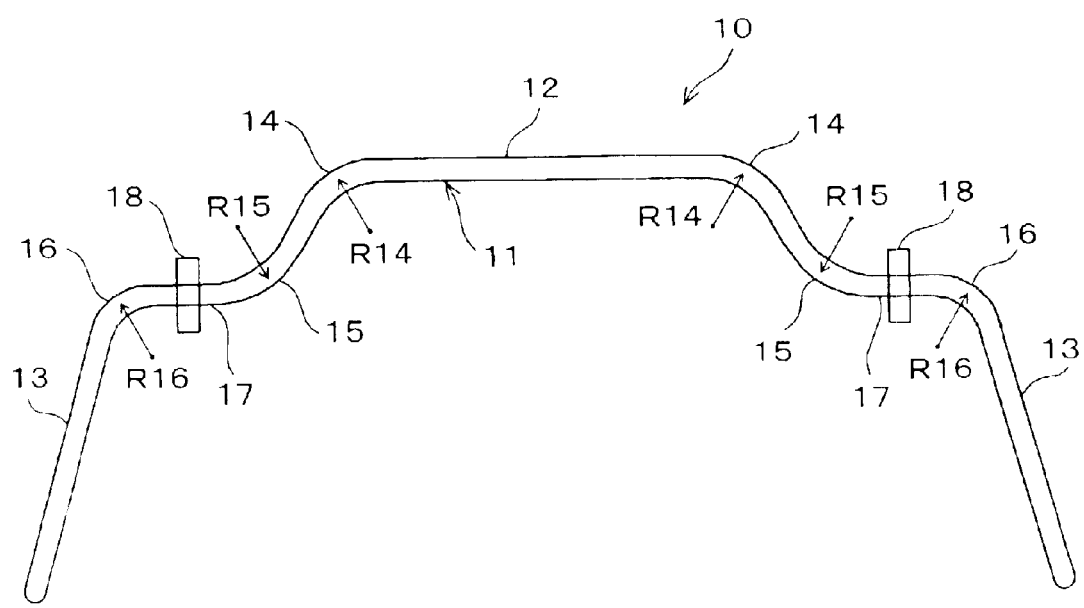
FIG. 1 is an overall view of a hollow stabilizer showing one embodiment in accordance with the present invention.

A description will be given of a first embodiment in accordance with the present invention with reference to the accompanying drawings. A hollow stabilizer 10 shown in FIG. 1 is provided with a stabilizer main body 11 constituted by a substantially round pipe made of steel. The stabilizer main body 11 is constructed so as to be provided with a torsion portion 12 which extends in a width direction of a vehicle, a pair of right and left arm portions 13 which are positioned in both ends of the torsion portion 12, circular arc curved portions 14, 15, and 16 and support portions 17 which are positioned between the torsion portion 12 and the arm portions 13, and the like, in the same manner as conventionally. In this case, there is a case in which the curved portion is provided in the arm portions 13 and the torsion portion 12.

In this hollow stabilizer 10, a straight portion exists between the curved portions 15 and 16. However, no straight portion exists between the curved portions 14 and 15. Furthermore, the torsion portion 12 or the support portions 17 are supported to a side of the vehicle body via support members 18 such as rubber bushes, brackets and the like, and the arm portions 13 are connected to members in a side of an axle such as suspension arms or the like via stabilizer links (not shown).

In this hollow stabilizer 10, in the same manner as conventionally, loads are applied to the respective arms 13 in opposing vertical directions to each other at a time when the vehicle turns, whereby the respective arm portions 13 are bent in opposite directions to each other, and the torsion portion 12 is twisted. In accordance with a spring effect which is generated in the torsion portion 12, the arm portions 13, the curved portions 14, 15 and 16 and the like in the manner mentioned above, the vehicle body is inhibited from rolling. A steel round pipe used for the stabilizer main body 11 is, for example, a steel tube made of a component corresponding to a spring steel.

Figure 4:
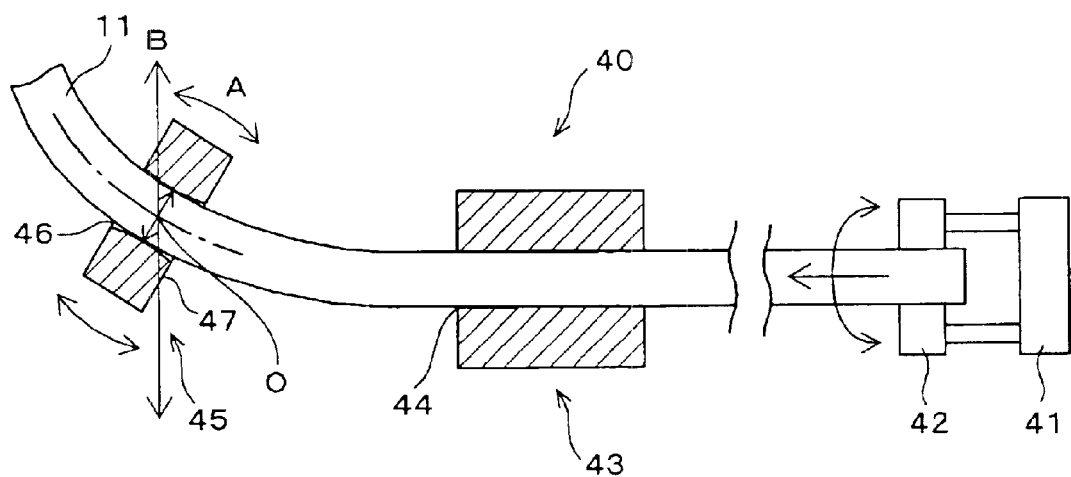
FIG. 4 is a view showing an example of a bending apparatus which is used in the present invention.
Figure 5:
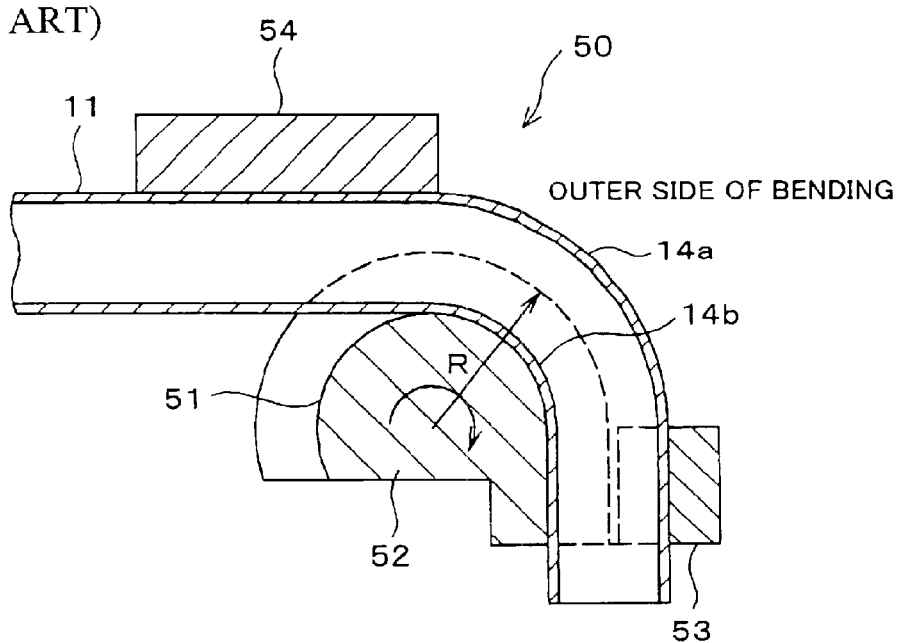
FIG. 5 is a view showing an example of a conventional bending apparatus.

A pipe bender 40 for bending the tube to form the hollow stabilizer 10 is shown in FIG. 4. The pipe bender 40 is constituted by a feeding apparatus 41 which delivers the stabilizer main body 11 toward a fixing jig 43, the fixing jig 43 and a movable jig 45.

A clamp 42 is provided in the feeding apparatus 41. The clamp 42 feeds the stabilizer main body 11 to the fixing jig 43, and rotatably fixes the stabilizer main body 11.

The fixing jig 43 has an opening 44 through which the stabilizer main body 11 passes. The fixing jig 43 forms a positioning part for bending the stabilizer main body 11 against the movable jig 45 (the bending jig).

The movable jig 45 has an opening 46 through which the stabilizer main body 11 passes. Furthermore, the movable jig 45 is constructed so as to be moved in a horizontal direction and a perpendicular direction by a driving mechanism. Further, the movable jig 45 is structured such as to be rotated in a horizontal direction (direction A) around a point O on a center line of the stabilizer main body 11 by the driving mechanism.

First, a description will be given of a case of bending with a fixed bending radius with a flat surface (a case of bending the curved portion 16). In a state of coinciding axes of the feeding apparatus 41, the fixing jig 43, and the movable jig 45 with each other, the stabilizer main body 11 which is clamped by the clamp 42 at a rear end passes through the opening 44 provided in the fixing jig 43 and the opening 46 provided in the movable jig 45 by the feeding apparatus 41. When the stabilizer main body 11 is pushed out to the bending position, the movable jig 45 moves in a direction of bending the stabilizer 11. Accompanying the movement of the movable jig 45, the movable jig 45 rotates around the point O on the center line of the stabilizer 11, and at this time, the axis of the stabilizer main body 11 becomes approximately perpendicular to a surface 47 in an inlet side of the opening 46. When the movable jig 45 is fixed and the stabilizer main body 11 is pushed out in this state, the curved portion 16 having a fixed radius is continuously formed.

Next, a description will be given of a procedure of bending the curved portions 15 and 14. First, the curved portion 15 is bent in accordance with the same procedure as that at a time of bending the curved portion 16. At this time, a position and an angle of rotation of the movable jig 45 are adjusted so that the bending radius becomes R15. FIG. 4 shows a state in which the bending of the curved portion 15 is completed being bent. The movable jig 45 is moved in a direction of arrow B in the drawing from this state and is rotated in a direction of arrow A, and the clamp 42 is rotated. Accordingly, the stabilizer main body 11 is bent between a point O on the center line of the stabilizer main body 11 and the fixing jig 43 so that the point O becomes a point of inflection. Furthermore, when fixing the movable jig 45 and pushing out the stabilizer main body 11, the curved portion 14 having a fixed bending radius is formed. At this time, the position and the angle of rotation of the movable jig 45 are adjusted so that the bending radius becomes R14. In the manner mentioned above, the curved portions 15 and 14 having the different bending radii R15 and R14 can be bent without forming the straight portion between the curved portions 15 and 14.

Figure 2:
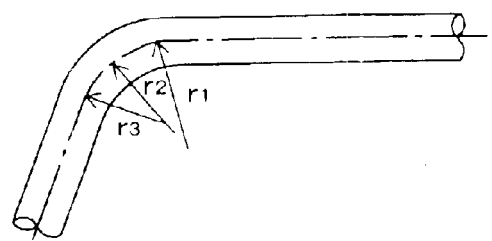
FIG. 2 is an enlarged view of a curved portion of the hollow stabilizer shown in FIG. 1.

In the case of changing the bending radius within one curved portion, the bending radius can be changed as shown by reference symbols r1, r2 and r3 in FIG. 2 by changing the moving amount and the angle of rotation of the movable jig 45 during the bending process.

In the case of bending the curved portion in three dimensions, that is, in the case of bending it in a spiral shape, the stabilizer main body 11 is delivered to the fixing jig 43 by the clamp 42. When moving the movable jig 45 in the horizontal direction and the perpendicular direction in this state and rotating the movable jig 45 at a predetermined angle, the stabilizer main body is curved in a spiral shape. Furthermore, when fixing the movable jig 45 in this state and pushing out the stabilizer main body 11, the curved portion having the fixed bending radius and formed in the spiral shape is continuously formed. Furthermore, a complex spiral shape can be formed by adjusting a moving speed and a moving amount of the movable jig 45 in the horizontal direction and the perpendicular direction. The horizontal bending apparatus may employ any apparatus as long as it can change the bending radius of the pipe and can bend it in a spiral shape, in addition to the apparatus shown in FIG. 4.

Figure 3A:
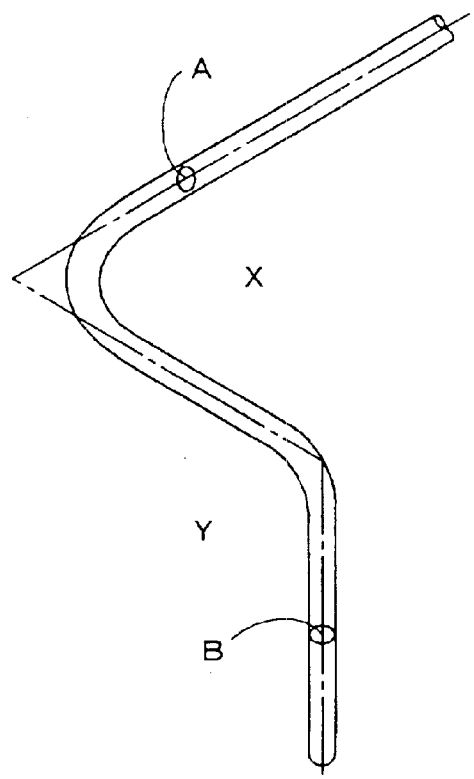
FIG. 3A is an enlarged three-dimensional forming view of a curved portion of a conventional hollow stabilizer.
Figure 3B:
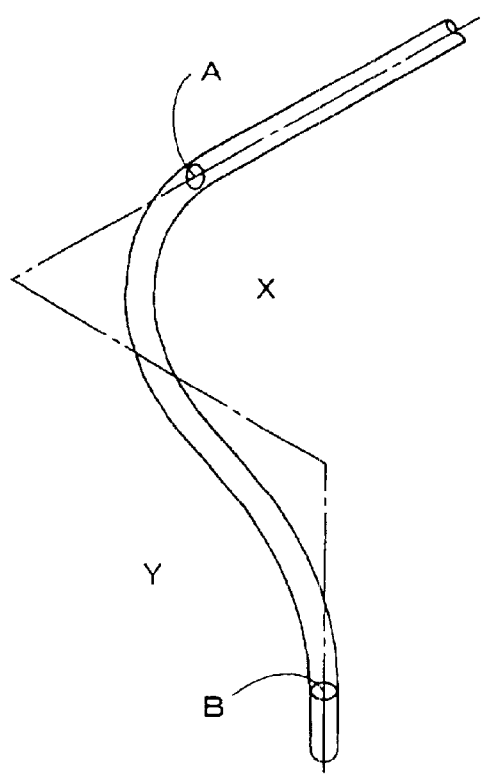
FIG. 3B is an enlarged three-dimensional forming view of the curved portion of the hollow stabilizer in accordance with the present invention.

The curved portion of the hollow stabilizer which is formed by the bending apparatus mentioned above is shown in FIGS. 3A and 3b. FIG. 3A shows the hollow stabilizer to which the conventional bending process is applied, and is shown for the purpose of comparison. FIG. 3B shows the hollow stabilizer in the embodiment in accordance with the present invention. In the conventional hollow stabilizer shown in FIG. 3A, the two-dimensional bending processes are performed within a flat surface X and a flat surface Y from a point A to a point B in the drawing, respectively, and the bending processes within the respective flat surfaces are combined, whereby a three-dimensional bending process is performed. In contrast, in the hollow stabilizer in accordance with the present invention shown in FIG. 3B, the bending process is performed in three dimensions so as to be formed in an approximately spiral shape from the point A to the point B. As a result, it is possible to shorten the material length between two points. Furthermore, since the bending radius can be made large, it is possible to prevent the pipe from being flattened and becoming unevenly thickened, when bending the hollow stabilizer. Further, in FIG. 3A it is necessary to dispose the straight portion between a curved portion and a curved portion. However, in FIG. 3B, since it is possible to form a continuous bend, it is possible to make the radius of the curved portion larger.

What is claimed is:

1. A hollow stabilizer made of steel pipe, comprising:
   a torsion portion extending in a width direction of a vehicle body;
   a pair of right and left arm portions positioned at both end sides of the torsion portion; and
   a plurality of curved portions which are bent in an arc shape in any of the torsion portion, the arm portions and portions therebetween,
   wherein at least one curved portion has a plurality of different bending radii.

2. A hollow stabilizer made of steel pipe, comprising:
   a torsion portion extending in a width direction of a vehicle body;
   a pair of right and left arm portions positioned at both end sides of the torsion portion; and
   a plurality of curved portions which are bent in an arc shape in any of the torsion portion, the arm portions and portions therebetween,
   wherein at least one curved portion is bent substantially in a spiral shape.

* * * * *